March 14, 1933.  P. M. BOURDON  1,901,078
VEHICLE WHEEL
Filed Dec. 14, 1931  2 Sheets-Sheet 1
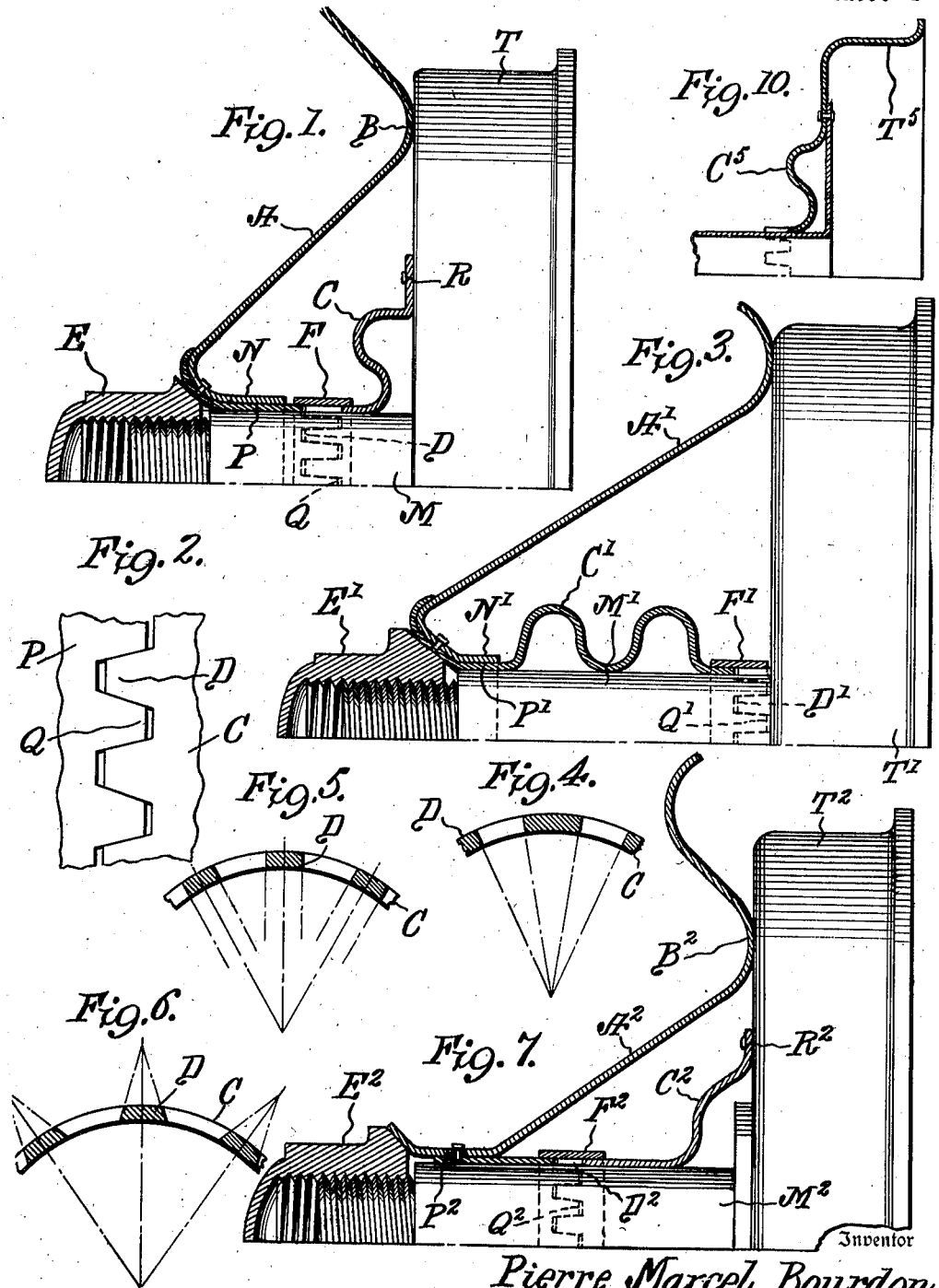

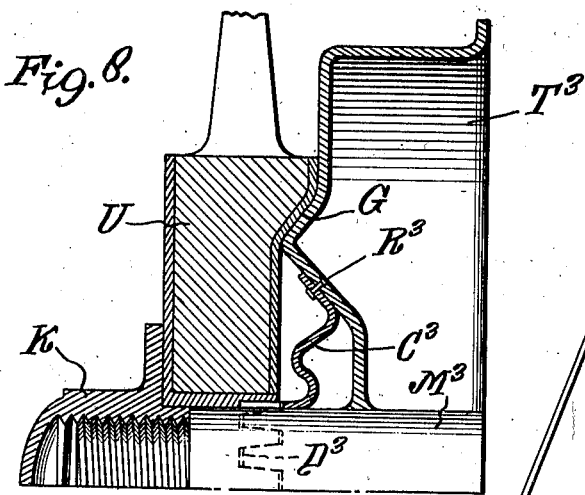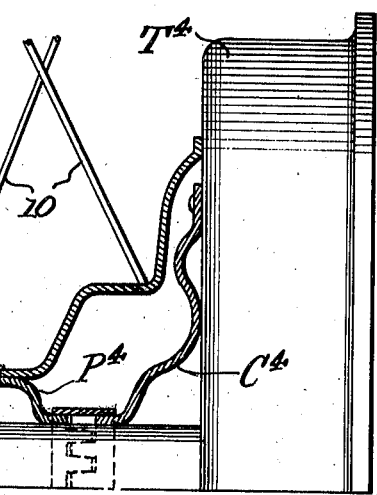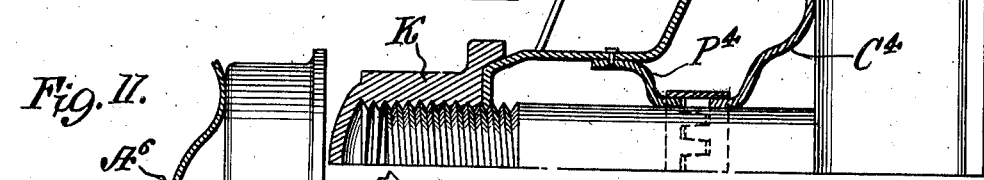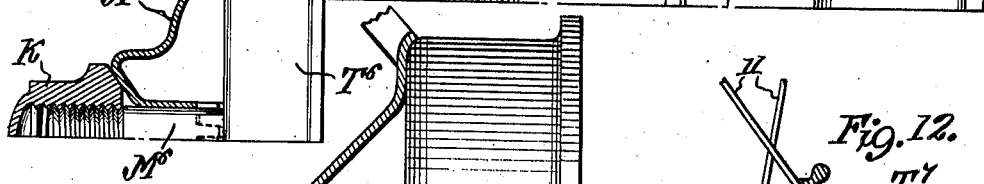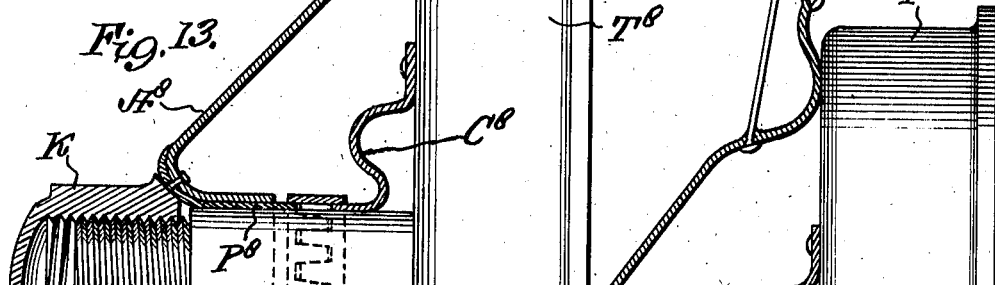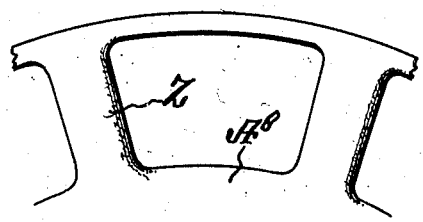

Patented Mar. 14, 1933

1,901,078

UNITED STATES PATENT OFFICE

PIERRE MARCEL BOURDON, OF PARIS, FRANCE, ASSIGNOR TO MICHELIN ET CIE., OF CLERMONT-FERRAND, FRANCE, A CORPORATION OF FRANCE

VEHICLE WHEEL

Application filed December 14, 1931, Serial No. 580,962, and in France January 17, 1931.

The present invention relates to improvements in vehicle wheels and has for an object to provide an improved removable wheel which bears against the brake drum or the like.

The invention further aims to provide interlocking teeth between the wheel and the hub, such teeth being held in mesh under elastic pressure which is controlled by a threaded hub or screw cap.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken through a portion of a wheel constructed in accordance with the present invention.

Figure 2 is a fragmentary plan view of the interlocking tooth arrangement.

Figure 3 is a view similar to Figure 1 showing a modification.

Figures 4, 5 and 6 are diagrammatic views showing various forms of teeth.

Figure 7 is a vertical section showing a further modified form of wheel.

Figure 8 shows a fragmentary vertical section of a wooden spoke wheel to which the invention is applied.

Figure 9 is a similar view showing the invention as applied to a metallic spoked wheel.

Figure 10 is a vertical section of a modified form of brake drum.

Figure 11 is also a vertical section of a wheel embodying the invention.

Figure 12 is a vertical section showing the invention as applied to a wire wheel.

Figure 13 is a similar view showing the invention as applied to a stamped metal wheel, and Figure 14 is a fragmentary front elevation of the stamped wheel.

Referring more particularly to Figure 1, A represents a disk wheel and M the hub on which this wheel is mounted. The hub carries a brake drum T against which the disk wheel A bears as at the point indicated at B.

The disk bears annularly all about the drum T. The central part of the disk A is rounded and carried inwardly along the hub M to form a cylindrical bearing part N. Riveted or otherwise secured to this part N is a reinforcing bearing cylinder P. Opposed to this cylinder P, which fits upon the hub M, is an elastic or resilient member C fixed at R to the brake drum T, and embodying in its construction preferably a series of curves in order to impart the desired resiliency. The members may be made of appropriate metal.

Teeth of trapezoidal or other form D and Q are provided upon the members C and P, which teeth are adapted to intermesh, as indicated in Figure 2. Owing to the elasticity of the member C, the teeth are resiliently held in mesh. There is a screw cap or hub cap E threaded upon the outer threaded portion of the hub M which functions to bind the disk wheel upon the hub and incidentally may be screwed up tightly to place the member C under appropriate tension whereby the teeth are bound more tightly together. Also the disk A will bear very tightly at B upon the brake drum and thus the disk wheel will be placed under proper tension and will be bound to rotate. At the same time, the wheel may be readily removed and reapplied by simply one fastening means E.

An annular part or ring F may be placed around the teeth D and Q to prevent foreign matter from entering between such teeth during the movement of the vehicle.

In Figure 1 the elasticity is secured from the member C.

In Figure 3 however the elastic member C' is carried by the disk wheel A' and extends along the hub M' and over into proximity to the brake drum T'. This part C' includes reverse loops in order to impart the necessary resiliency and it carries the teeth Q', trapezoidal or of other form, which engage the similar and complemental teeth D' carried by the hub M' or by the brake drum T. The elasticity in this case is given by the part C' under the action of the screw or hub cap E'.

The shape of the teeth may be optional. A few desirable shapes are indicated in Figures 4, 5 and 6. Figures 4 and 6 show teeth with inclined faces while Figure 5 shows teeth with parallel faces.

Referring to Figure 7, a modification is here shown in which the elastic part C² is fixed to the brake drum T² as indicated at R². The disk wheel A² has secured to it by rivets or otherwise a cylindrical piece P², and teeth D² and Q² are provided between the members C² and P² being covered by a ring F² if desired. If desired, the part P² of the wheel carrying the teeth also possesses a certain elasticity. The locking screw or hub cap E² may be provided with a lock to prevent the unauthorized removal thereof.

Referring to Figure 8, the invention is shown as applied to a wooden wheel or a wheel other than a disk wheel. The wooden wheel is shown at U and it is carried upon the hub M³ being held thereto by a hub cap K. The elastic member C³ is fixed to the brake drum T³, as indicated at R³. Teeth D³ are made between the member C³ and the wheel U, the wheel being applied against a conical annular surface G of the brake drum. In this case also, the teeth D³ are held in an elastic manner.

In Figure 9, a wheel having metal spokes 10 is shown. This wheel carries an annular or cylindrical part P⁴ having teeth which engage with the teeth of the resilient member C⁴ which is affixed to the brake drum T⁴. The wheel is held in place by the member K.

In Figure 10, a modification is shown in which the elastic member C⁵ is formed in one piece with the brake drum T⁵.

In Figure 11, a further modification is shown in which the disk wheel A⁶ itself forms the elastic member and carries the teeth which mesh with the teeth upon the hub M⁶ or the brake drum T⁶.

Referring to Figure 12, this also shows a wheel in which the wire spokes 11 are employed, including the toothed members P⁷ and C⁷, the latter member being affixed to the brake drum T⁷.

Referring to Figures 13 and 14, there is shown a metallic wheel in which the disk A⁸ is provided with a cylindrical member P⁸ having teeth for meshing with similar teeth upon the elastic member C⁸ affixed to the brake drum P⁸.

In Figure 14, the spokes Z are shown to be stamped in the outer part of the disk A⁸, the central part being preferably imperforate. The length of the spokes Z is optional. Although the various forms of the invention include a central locking screw or hub cap, it will be apparent that many other modes of attaching the wheels to the hubs may be used. The elastic part may be carried by the wheel, by the hub or by both at the same time.

By the use of the device, the gear teeth are constantly maintained in mesh and the motion of the axle is taken up without play by the wheel. The mounting and demounting is effected in a sure and rapid manner.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:

1. In a vehicle wheel construction, a vehicle wheel carrying teeth, a hub, a brake drum, and an elastic member on the brake drum having teeth to mesh with the teeth of the wheel, and securing means for the wheel for binding the teeth together and placing the elastic member under tension.

2. In a vehicle wheel construction, a wheel having teeth, a hub for demountably receiving said wheel, a brake drum, a curved member secured to the brake drum and having teeth to detachably mesh with the teeth of the wheel, a protecting means extending about said intermeshing teeth, and a screw cap on the hub bearing against the wheel for binding the wheel against the brake drum holding the teeth in mesh and placing said elastic member under tension.

3. In a vehicle wheel construction, a disk wheel, a brake drum for receiving annularly thereagainst a portion of the disk wheel, a hub on which the disk wheel is demountably fitted, a flexible member carried by said brake drum and extending along the hub having teeth thereon, a member carried by said wheel extending along the hub and having teeth intermeshing with the first mentioned teeth, and a fastening means for engaging the same to force the wheel with tension against said brake drum and to force the teeth together placing the flexible member under tension.

4. In a vehicle wheel construction, a hub, a wheel demountably associated with the hub, an elastic member fitted over the hub, means for both binding the wheel on the hub and compressing the elastic member, teeth between the hub and said elastic member, and a band extending over said teeth.

5. In a vehicle wheel construction, a demountable wheel, a hub, a brake drum, means on the outer portion of the hub for engaging said wheel and forcing the same against said brake drum, an elastic member secured at one end to the inner portion of the wheel and extending inwardly along the hub and having a number of curved portions to increase flexibility, and teeth between said hub and the elastic member, said elastic member being put under tension by said means whereby to bind the teeth intimately together.

6. In a vehicle wheel construction, a hub member provided with teeth and including a brake drum as an element thereof, a wheel member having a portion bearing against said brake drum slidably mounted on said hub member and having teeth to mesh with those of the hub member, the teeth of one of said members being formed on a flexible element carried by a portion thereof, together with means engageable with the wheel member for retaining it in position on the hub member and for forcing the teeth together placing the flexible element under tension.

PIERRE MARCEL BOURDON.